No. 765,980. PATENTED JULY 26, 1904.
A. MERCIER, SON.
PHOTOGRAPHIC CAMERA SUPPORT.
APPLICATION FILED FEB. 6, 1904.
NO MODEL.
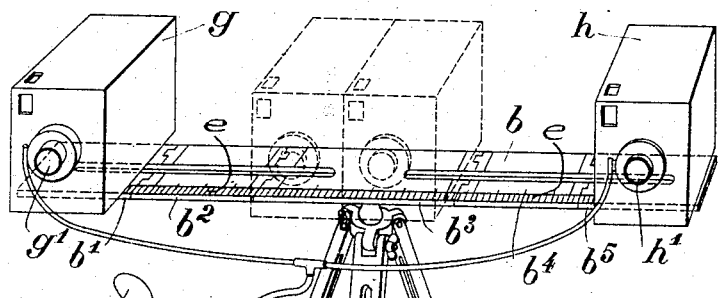
Fig. 1.
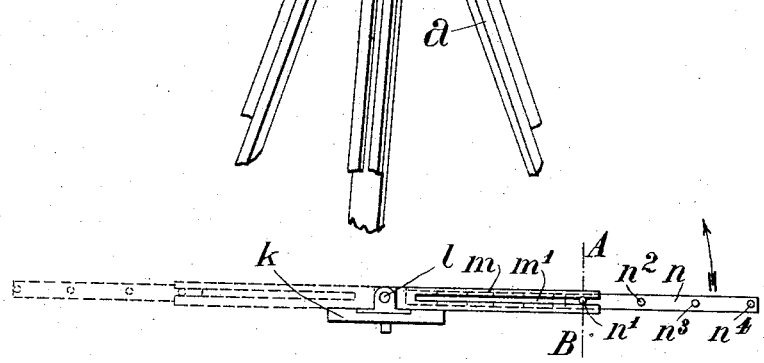
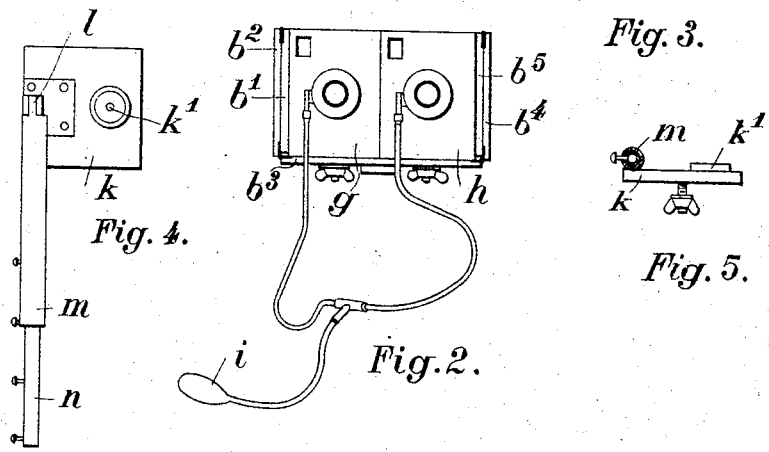
Fig. 3.
Fig. 4.
Fig. 5.
Fig. 2.
WITNESSES
Henry J. Suhrtier.
Frank E. Boyce.
INVENTOR
Adrien Mercier, Son
BY Foster Niles
ATTORNEYS.

UNITED STATES PATENT OFFICE.

ADRIEN MERCIER, SON, OF LAUSANNE, SWITZERLAND.

PHOTOGRAPHIC-CAMERA SUPPORT.

SPECIFICATION forming part of Letters Patent No. 765,980, dated July 26, 1904.

Application filed February 6, 1904. Serial No. 192,445. (No model.)

*To all whom it may concern:*

Be it known that I, ADRIEN MERCIER, Son, a citizen of the Republic of Switzerland, residing at Lausanne, Switzerland, have invented certain new and useful Improvements in Photographic-Camera Supports, of which the following is a specification.

The devices used at the present time for the production of stereoscope-pictures have the disadvantage that they obtain the optical deepness effect required for them only when a certain distance from the objects the view of which is to be taken and that the said effect is not to be obtained in all parts of the picture. In a landscape, for instance, the perspective effect or relief obtained with the stereoscope will be sharply marked for the trees of the foreground and not at all in the hills forming the background of the landscape. This inconvenience is to be ascribed to the fact that the two original views made use of for the stereoscope are taken by two object-glasses placed at a certain usual distance from one another, which is always the same, however different the nature of the object to be reproduced might be.

It has been ascertained that stereoscopic pictures of much greater perspective intensity will be obtained by suitably adjusting the distance between the objectives intended to take the view in question; and the object of the present invention is to provide an apparatus realizing the aforesaid purpose.

The accompanying drawings show one form of construction of the invention.

Figure 1 shows in perspective view an apparatus with two stereoscopic cameras ready for use. Fig. 2 is a side view of the same apparatus folded and shown without its support. Fig. 3 shows another form of construction in elevation. Fig. 4 is a top view of same. Fig. 5 is a section through A B of Fig. 3.

In Figs. 1 and 2 the support $a$, which may be of any form whatever, is provided with a slide $b$, consisting of five parts $b'$, $b^2$, $b^3$, $b^4$, and $b^5$, hinged together, and which may be laid down horizontally, as shown in Fig. 1, or folded, as shown in Fig. 2. The central part $b^3$ of said slide is provided with a nut intended to receive the screw of a support of any photographic apparatus. Said slide is provided with graduations $e$, ranging from the center to the right and the left hand, thus forming divisions on the same which indicate corresponding points placed at the same distance apart from the center. $g$ and $h$ are two cameras of any construction whatever, the object-glasses $g'$ and $h'$ of which are provided with suitable shutters, which are actuated simultaneously by means of an india-rubber ball $i$. The cameras $g$ and $h$ are both connected with the slide by means of nuts intended to fix the said cameras on said slide at a variable distance from the center, the divisions provided on the slide allowing to adjust the two cameras always in the same distance from the visual point, (center of the slide.)

According to the distance of the object to be photographed or to the deepness of the view to be taken, the cameras $g$ and $h$ are to be placed at a more or less great distance from one another, and thus stereoscopic pictures will be obtained showing when examined through an ordinary stereoscope a very intense relief effect in all parts of the picture.

The slide $b$ may be rigid instead of being broken, and it can be utilized with a single camera of any usual type whatever placed successively in the position of the camera $g$ and that of camera $h$, and thus obtaining with one and the same camera and one objective two corresponding stereoscopic views. The slide $b$ may be provided with any suitable device allowing to fasten thereon the photographic apparatus. The slide $b$ might, for instance, have a certain number of pins intended to engage with corresponding fastening means on the camera or cameras.

Figs. 3, 4, and 5 show one form of carrying out the invention with a single camera. $k$ is a plate intended to be fastened to any support whatever and which is provided with a level $k'$. This plate bears a hinge $l$, to which is pivotally connected a tubular arm $m$, in the longitudinal slit $m'$ of which moves the hook $n'$ of a telescoping rod $n$, allowing the drawing out of the same. $n^2$, $n^3$, and $n^4$ are pins similar to $n'$ intended to engage with any means for supporting any suitable photographic apparatus whatever—for instance, a folding kodak. After having operated with such a camera fastened to one of said pins in the position of arm *m* (shown in full lines in Fig. 3) said arm may be overlapped to the left-hand side, as indicated in the same figure, thus enabling the operator to work with the same apparatus in this second position.

Having thus fully described my invention, I claim—

1. In a photographic-camera support, the combination, with a support having an arm pivoted thereto, of a camera carried by said arm and adjustable along the same so as to vary its distance from said support.

2. In a photographic-camera support, the combination with a support, of a graduated arm carried thereby and extending to either side of the same, cameras carried by said arm, and means for clamping said cameras at predetermined distances from the center of the same.

3. In a photographic-camera support, the combination with a support, of an arm carried thereby, said arm having slots therein, cameras carried upon said arm, and means upon said cameras coöperating with said slots for clamping said cameras at predetermined distances along said arm.

4. The combination with a support, of a graduated arm carried thereby extending an equal distance to either side of the same, said arm having longitudinally-disposed slots in either side thereof, cameras supported on said arms, and clamping-screws upon the cameras slidable in said slots, whereby said cameras are clamped at predetermined distances along said arm.

5. A photographic-camera support, comprising a support having a camera-carrying arm, and a camera attached to said arm, said arm having hinged portions foldable upon two sides of said camera.

In testimony that I claim the foregoing as my invention I have signed my name in presence of two subscribing witnesses.

ADRIEN MERCIER, Son. [L. S.]

Witnesses:
B. HOWELL-THOMAS,
FRANK CUÈNOD.